United States Patent [19]
Kato et al.

[11] 3,856,707

[45] Dec. 24, 1974

[54] METHOD FOR PREPARING A MONOLITHIC CATALYST CONTAINING A SOL AND THE CATALYST OBTAINED THEREFROM

[75] Inventors: Tadanari Kato; Tadashi Ikemi; Tutomu Ooishi, all of Yokohama, Japan; Mitsuyoshi Sano, Yokosuka; Hengo Hayashida, Yokosuka; Chinami Matsumoto, Yokosuka, all of Japan

[73] Assignee: Nissan Motor Company Limited, Yokohama City, Japan

[22] Filed: Nov. 7, 1972

[21] Appl. No.: 304,300

[30] Foreign Application Priority Data
Nov. 8, 1971  Japan .............................. 46-88299

[52] U.S. Cl. ........ 252/455 R, 252/460, 252/466 PT, 252/477 R
[51] Int. Cl. ............................................. B01j 11/08
[58] Field of Search .......... 252/455 R, 466 PT, 460, 252/439, 477 R

[56] References Cited
UNITED STATES PATENTS

| | | | |
|---|---|---|---|
| 2,742,437 | 4/1956 | Houdry | 252/466 PT |
| 2,861,958 | 11/1958 | Barrett et al. | 252/460 |
| 3,331,787 | 7/1967 | Keith et al. | 252/439 |
| 3,518,206 | 6/1970 | Sowards et al. | 252/460 |
| 3,549,720 | 11/1970 | Wright et al. | 252/455 R |
| 3,565,830 | 2/1971 | Keith et al. | 252/460 |
| 3,617,521 | 11/1971 | Houston et al. | 252/466 PT |
| 3,629,152 | 12/1971 | Lindsley et al. | 252/455 R |

OTHER PUBLICATIONS

Turner, The Condensed Chemical Dictionary, Reinhold Publishing Corp., N.Y., N.Y., 4th ed., 1950, p. 184, 247, 615.

*Primary Examiner*—Daniel E. Wyman
*Assistant Examiner*—A. P. Demers

[57] ABSTRACT

A monolithic carrier provided with longitudinal holes or passages is immersed in a mixed solution containing a salt of the platinum group metal and a sol of the alumina type as additional material. After immersion the coated carrier is dried in hot air and the salt is reduced in a stream of hydrogen at an elevated temperature to a metal to give a catalyst on the monolithic carrier. The sol may be converted into a gel before the reduction step.

18 Claims, No Drawings

METHOD FOR PREPARING A MONOLITHIC CATALYST CONTAINING A SOL AND THE CATALYST OBTAINED THEREFROM

This invention relates to a method of preparing a catalyst suitable for treating exhaust gases emitted from internal combustion engines and more particularly to a method of preparing a monolithic catalyst having a plurality of holes extending longitudinally through the carrier and carrying thereon an element of the platinum group as a catalytic component.

In prior art methods of preparing catalysts using an element of the platinum group such as platinum, palladium or the like, it is common practice to impregnate a porous carrier, which is formed into the shape of a sphere, pellet, tablet or the like, with an aqueous solution of a compound of an element of the platinum group and to dry the thus impregnated carrier. Thereafter, the resultant carrier is heated and reduced in a stream of hydrogen to activate the catalytic component, whereby a catalyst will be obtained. The catalysts thus obtained are used in a densely filled state in a reactor tube through which exhaust gases are passed. Particularly when used as a catalyst for treatment of exhaust gases from internal combustion engines, the catalyst tends to easily wear out due to mechanical vibrations imposed thereon while in operation, so that it is almost impossible to use the same over a long period of time.

In order to improve the attrition-resistance of the catalyst, there has been proposed a catalyst using a specific type or block or lump type carrier (hereinafter referred to as a monolithic carrier) which is in a cylindrical or other suitable form having a plurality of holes extending in one or more directions through the carrier and carrying a catalytic component of a platinum group element therein. In this connection, the catalytic component can be carried onto a monolithic carrier in a manner similar to a conventional granular carrier, viz., a monolithic carrier is impregnated with an aqueous solution of a compound of an element of the platinum group.

However, the difficulties have been encountered when drying the thus impregnated monolithic carrier. The impregnating solution dries first at the ends and outer peripheral portions of the monolithic carrier, so that the aqueous liquid remaining in the holes of the monolithic carrier tends to move toward the ends and outer peripheral portions of the carrier by capillary action. As a result, the catalytic component can not be maintained uniformly distributed radially and longitudinally of the monolithic carrier, the catalytic component locally concentrating at the ends and outer peripheral portions of the carrier. This is disadvantageous from a standpoint of obtaining efficient catalytic activity.

It is therefore an object of the present invention to provide a method of preparing a monolithic catalyst having a catalytic component uniformly distributed over all portions of the carrier.

It is another object of the present invention to provide a method of preparing a monolithic catalyst having excellent attrition-resistance and improved activity.

It is still another object of the present invention to provide a monolithic catalyst by the above-mentioned method.

According to the present invention, there is provided a method of preparing a catalyst comprising impregnating a monolithic carrier having a plurality of holes extending in one or more directions through the carrier with a solution of a compound of an element of the platinum group as a catalytic component, the element being mixed in a sol of an additive material.

The addition of the sol effectively prevents the movement of the catalytic component toward the ends and outer peripheral portions of the carrier while the impregnated carrier is being dried, with the result that the catalytic component is uniformly distributed over the surfaces of the entire monolithic carrier.

The above-mentioned impregnating catalytic component is then dried and reduced to furnish activity thereto by a known method, for example, the catalytic component may be dried and then reduced to a metal in a stream of hydrogen at a temperature of 300° to 850°C. The amount of the metal is preferred to be 0.1 to 1.0% by weight based on the weight of the catalyst.

The compounds of the platinum group used in the present invention include chloroplatinic acid, palladium chloride and the like.

Alumina sol, alumina-silica sol or aluminium hydroxychloride sol are used as the sol of the additive material dissolved in a solvent such as water, an alcohol such as ethanol, methanol or the like or an ether such as methyl ether. It will be noted that the solvent of the sol should be miscible with a solvent of the solution of the compound of the platinum group, viz., a common solvent for both the compound of the platinum group and the sol, or different solvents miscible with each other should be used. For example, where chloroplatinic acid is used as a compound of the platinum group, and any of water, an alcohol and an ether is used as a solvent of the chloroplatinic acid, the same solvent may be used for the sol. The concentration of the additive material of alumina or alumina-silica contained in the mixture of the solution of the platinum group compound and the sol is within a range of 2 to 40% by weight, preferably 6 to 35% by weight. With aluminium hydroxychloride, the range of the concentration is calculated in terms of alumina. If the concentration of the additive material is less than 2% by weight, the catalytic component concentrates at the ends and outer peripheral portions of the monolithic carrier in a same manner as a solution of the platinum compound alone concentrates. If, on the contrary, the concentration is greater then 40% by weight, gelation occurs to increase the viscosity of the mixture, so that it almost impossible to satisfactorily impregnate the monolithic carrier with the mixture.

Where a mixed sol of alumina-silica is used, the alumina-silica ratio can be arbitrarily selected, but preferably the alumina contained in the mixed sol has a ratio higher than 1 : 2 by weight since the higher ratio of the silica tends to reduce the activity of the catalyst.

To improve the durability of the catalyst, the sol on the carrier may be gelled by a known method using an acid or alkali. In this case, the concentration of additive material in the mixture of the solution of the compound of the platinum group and the sol can be reduced since the sol is subjected to gelation prior to the drying stage. The concentration may be within a range of 0.2 to 40% by weight, preferably 1 to 35%. The sol concentration should be selected in such a manner that the viscosity of the mixed solution increases over that of a solution of a catalytic component alone and is within a range allowing easy impregnation of the carrier.

A carrier material for use with the catalyst according to the present invention may be any refractory material such as alumina ($Al_2O_3$), silica ($SiO_2$), silimanite ($Al_2O_3 \cdot SiO_2$), mullite ($3\ Al_2O_3 \cdot 2\ SiO_2$), cordierite ($2\ MgO \cdot 2\ Al_2O_3 \cdot 5\ SiO_2$), aluminium titanate ($Al_2O_3 \cdot TiO_2$), or silicon carbide (SiC).

The more detailed nature of the catalyst according to the present invention and the advantages of the catalyst over the prior art counterpart will be more clearly understood from the following examples of the invention and through comparison between these examples and a Comparative Example using a conventional preparation method.

EXAMPLE 1

A piece of a commercially available cylindrical monolithic carrier was used where longitudinal holes or passageways were formed by a multiple of corrugated walls made of cordierite. The cylindrical monolithic carrier which had an inner diameter of 4 inches, a length of 6 inches and the number of the corrugations was 8 per inch, was immersed for about 15 min. at room temperature in 1,000 g of a solution of a mixture of alumina sol and a chloroplatinic acid ($H_2PtCl_6 \cdot 6H_2O$) aqueous solution in which 2.0% by weight of chloroplatinic acid and 7.8% by weight of alumina were contained. The thus immersed carrier was removed from the solution, while the excessive liquid remaining in the holes or passages was also removed, and dried in a stream of dry air for about 14 hours. The resultant carrier was sintered in a stream of hydrogen at 550°C for 5 hours to obtain a monolithic catalyst. The thus obtained catalyst was subjected to a test to be described hereinafter.

EXAMPLE 2

A monolithic carrier as in Example 1 was immersed for about 15 min. at room temperature in 1,000 g of a solution of a mixture of a chloroplatinic acid aqueous solution and alumina sol in which 3.4% by weight of chloroplatinic acid and 2.9% by weight of alumina were contained. After the thus immersed carrier was removed from the solution and the excessive liquid remaining in the holes of the carrier was also removed, the same was dried in a stream of dry air for about 14 hours. Thereafter, the carrier thus dried was sintered in a stream of hydrogen at 550°C for 3 hours to obtain a monolithic catalyst.

EXAMPLE 3

A similar carrier as in Example 1 was immersed at room temperature for about 15 min. in 1,000 g of a solution of a mixture of a chloroplatinic acid aqueous solution and alumina sol in which 3.2% by weight of chloroplatinic acid and 9.6% by weight of alumina were contained. After the thus immersed carrier was removed from the solution and excessive liquid remaining in the holes of the carrier was also removed, ammonia gas was fed through the holes of the carrier for about 20 min. to convert the sol into a gel. Thereafter, the resultant carrier was dried in a stream of dry air for 14 hours and then sintered in a stream of hydrogen at 800°C for 3 hours to give a monolithic catalyst.

EXAMPLE 4

A similar carrier as in Example 1 was immersed at room temperature for about 15 min. in 1,000 g of a solution of a mixture of a chloroplatinic acid aqueous solution, alumina sol and silica sol in which 3.4% by weight of chloroplatinic acid, 3% by weight of alumina and 6% by weight of silica were contained. After the thus immersed carrier was removed from the solution and excessive liquid remaining in the holes of the carrier was also removed therefrom, ammonia gas was fed through the holes of the carrier for about 20 min. to convert the sol into a gel, and the resultant carrier was dried at 100°C for 14 hours. Then, the dried carrier was sintered in a stream of hydrogen at 550°C for 3 hours to give a monolithic catalyst.

EXAMPLE 5

A similar carrier as in Example 1 was first coated with gamma-alumina to an amount of 10% by weight, then immersed at room temperature for about 15 min. in 1,000 g of a solution of a mixture of a chloroplatinic acid aqueous solution and alumina sol in which 3.4% by weight of chloroplatinic acid and 5% by weight of alumina were contained. After the thus immersed carrier was removed from the solution and excessive liquid remaining in the holes of the carrier was also removed therefrom, ammonia gas was fed through the holes to convert the sol into a gel and the resultant carrier was dried at about 100°C for 14 hours. The thus dried carrier was sintered in a stream of hydrogen at 300°C for 3 hours and then the temperature was raised up to 550°C over a time period of 15 hours for sintering the carrier at this temperature for 3 hours to form a monolithic catalyst.

EXAMPLE 6

A similar carrier as in Example 5 was immersed at room temperature for about 15 min. in 1,000 g of a solution of a mixture of a palladium chloride aqueous solution and alumina sol in which 2.6% by weight of palladium chloride and 3.4% by weight of alumina were contained. The thus immersed carrier was removed from the solution and excessive liquid remaining in the holes of the carrier was also removed. Thereafter, ammonia gas was fed through the holes to convert the sol into a gel and the resultant carrier was dried at about 100°C for 14 hours. The thus dried carrier was in a stream of hydrogen gas sintered at 550°C for 3 hours to give a monolithic catalyst.

EXAMPLE 7

A similar carrier as in Example 5 was immersed at room temperature for about 15 min. in 1,000 g of a solution of a mixture of a chloroplatinic acid aqueous solution, alumina sol and silica sol in which 3.4% by weight of chloroplatinic acid, 3% by weight of alumina and 2% by weight of silica were contained. The thus immersed carrier was removed from the solution and excessive liquid remaining in the holes of the carrier was also removed therefrom. Thereafter, ammonia gas was fed through the holes of the carrier for about 20 min. thereby gelling the sol, and the resultant carrier was dried at about 100°C for 14 hours. Then, the thus dried carrier was sintered in a stream of hydrogen gas at 550°C for 5 hours to give a monolithic catalyst.

EXAMPLE 8

A similar carrier in Example 1 was immersed at room temperature for about 15 min. in 1,000 g of a solution of a mixture of chloroplatinic acid aqueous solution and aluminum hydroxychloride sol in which 2.5% by weight of chloroplatinic acid and 25% by weight of alumina were contained. The thus immersed carrier was removed from the solution and excessive liquid remaining in the holes of the carrier was also removed. Then, ammonia gas was fed through the holes of the carrier for 20 min. thereby gelling the sol attached to the walls of the holes and the resultant carrier was dried in a stream of dry air. The thus dried carrier was sintered in a stream of hydrogen at 550°C for 3 hours to obtain a monolithic catalyst.

A specimen was prepared as a representative example of the prior art catalyst for comparison with the catalysts prepared in accordance with the present invention as described in the above examples.

COMPARATIVE EXAMPLE

A similar monolithic carrier as in Example 1 was immersed at room temperature for about 15 min. in 1000 g of a chloroplatinic acid aqueous solution in which 3.7% by weight of chloroplatinic acid was contained. The thus immersed carrier was removed from the solution and excessive liquid remaining in the holes of the carrier was also removed. Thereafter, the resultant carrier was dried in a stream of dry air. The thus dried carrier was sintered in a stream of hydrogen for 3 hours to give a monolithic catalyst.

The monolithic catalysts prepared according to the above Examples 1 through 8 and the Comparative Example were subjected to a test in which the catalysts were longitudinally cut into halves for cross-sectional inspection with regard to the distribution of platinum or palladium. The cross-sectional inspection was conducted by analyzing the amount by weight % of a catalytic component contained in central portions of the monolithic catalyst and that contained in end portions. The central portions of the monolithic carrier mean those portions of the carrier containing holes and cut offs of both ends, and outer peripheral portions thereof mean the end portions. The analytical results are shown in Table 1 below.

Table 1

|  | Central portions | End portions |
| --- | --- | --- |
| Example 1 | 0.3* | 0.36 |
| do. 3 | 0.32 | 0.38 |
| do. 4 | 0.43 | 0.50 |
| do. 7 | 0.43 | 0.48 |
| Comparative Example | 0.11 | 1.05 |

*The unit of the numerical value is expressed in terms of % by weight of Platinum.

As is apparent from the above results, the specimens prepared in accordance with the present invention show a uniform distribution of platinum all over the entire monolithic catalyst, but the specimen of the Comparative Example has an uneven localized distribution, where the catalytic component was found distinctively in greater amounts in the ends and outer peripheral portions than in the inner portions of the monolithic catalyst.

Tests were further conducted to evaluate the catalytic performance of the catalysts prepared according to Examples 1 through 8 and the Comparative Example. A composite gas composed of 2% of CO, 500 ppm of $C_3H_8$, 2.5% of $O_2$, 1,000 ppm of NO, 12% of $CO_2$ and the balance of $N_2$ was used as a model in the tests. The gas was fed to a reaction tube fitted with the monolithic catalyst while changing the temperatures of the catalysts tested, for determining oxidization temperatures for providing a conversion efficiency of 90 percent of CO and $C_3H_8$. The oxidization reactions were conducted at a constant space velocity of 15,000 $hr^{-1}$.

The test results are shown in Table 2 below.

Table 2

| Catalyst | 90% Conversion Temperature °C | |
| --- | --- | --- |
|  | CO | $C_3H_8$ |
| Example 1 | 340 | 445 |
| do. 2 | 300 | 425 |
| do. 3 | 355 | 440 |
| do. 4 | 320 | 395 |
| do. 5 | 340 | 405 |
| do. 6 | 345 | 455 |
| do. 7 | 335 | 415 |
| do. 8 | 350 | 460 |
| Comparative Example | 390 | 525 |

As is apparent from Tables 1 and 2, the monolithic catalysts prepared in accordance with the method of the present invention have superior uniformity of distribution of the catalytic component as compared with the counterpart by the prior art method, and are capable of oxidizing CO and $C_3H_8$ at temperatures lower than the prior art catalyst.

It should be noted that the catalytic component of an element of the platinum group can more uniformly be distributed in the monolithic carrier by the method of the present invention than by the prior art method, so that the performance of the catalyst can remarkably be improved.

It should further be understood that the catalyst obtained by the method of this invention can be also used successfully in treatment of exhaust gases emanated from any hydrocarbon burning apparatuses.

What is claimed is:

1. A method of preparing a catalyst for use in exhaust gas after-treatment systems of hydrocarbon burning apparatuses comprising the steps of providing a monolithic carrier with a plurality of through passageways from one end to the other; preparing a mixed solution containing a catalytic compound of the platinum group and a sol of an alumina containing additive; immersing said monolithic carrier into said mixed solution; removing said monolithic carrier from said mixed solution; gelling said sol by using an alkali or an acid; drying said monolithic carrier in air to obtain a carrier coated with said catalytic compound and said alumina-containing additive; and subjecting the coated carrier to hydrogen gas at an elevated temperature for reducing said catalytic compound to metal, whereby said catalyst comprising said carrier, said alumina-containing additive and said metal dispersed in said alumina-containing additive is obtained.

2. A method as claimed in claim 1, wherein said metal is contained within a range of 0.1 to 1.0% by weight of said catalyst.

3. A method as claimed in claim 1, wherein said compound is selected from the group consisting of chloroplatinic acid and palladium chloride.

4. A method as claimed in claim 1, wherein said sol is formed in a solvent compatible with the solvent of a compound of said element.

5. A method as claimed in claim 4, wherein the first-mentioned solvent is selected from the group consisting of water, an alcohol and an ether.

6. A method as claimed in claim 5, wherein said alcohol is selected from the group consisting of methanol and ethanol.

7. A method as claimed in claim 5, wherein said ether is methyl ether.

8. A method as claimed in claim 1, wherein said alumina containing additive is selected from the group consisting of alumina, a mixture of alumina and silica and aluminium hydroxychloride.

9. A method as claimed in claim 8, wherein said mixture of alumina and silica contains alumina at least at a ratio 1 : 2 by weight with respect to silica.

10. A method as claimed in claim 8, wherein said alumina is contained in the mixture of said solution and said sol in an amount of 2 to 40% by weight.

11. A method as claimed in claim 8, wherein said mixture of alumina and silica is contained in the mixture of said solution and said sol in an amount of 2to 40% by weight.

12. A method as claimed in claim 8, wherein said aluminium hydroxychloride is contained in the mixture of said solution and said sol in an amount of 2 to 40% by weight when calculated in terms of alumina.

13. A method as claimed in claim 1, wherein said carrier is made of a refractory material selected from the group consisting of alumina, silica, silimanite, mullite, cordierite, aluminium titanate and silicon.

14. A method as claimed in claim 1, wherein said elevated temperature is within a range of from 300° to 850°C.

15. A method as claimed in claim 1, wherein said alkali is ammonia.

16. A method as claimed in claim 1, wherein said alumina containing additive is contained in the mixture of said solution and said sol in an amount of 2 to 40% by weight.

17. A method of producing a catalyst comprising the steps of impregnating a monolithic carrier in a mixture of a solution of a compound selected from the group consisting of chloroplatinic acid and palladium chloride and a sol selected from the group consisting of alumina sol, alumina-silica sol and alumina hydroxychloride sol at room temperature for about 15 minutes, removing said carrier from the mixture, gelling said sol by using an alkali or an acid, drying in dried air for about 14 hours, and sintering the resultant carrier in a stream of hydrogen at 350°C to 800°C for 3 hours.

18. A method of producing a catalyst comprising the steps of impregnating a monolithic carrier in a mixture of a solution of a compound selected from the group consisting of chloroplatinic acid and palladium chloride and a sol selected from the group consisting of an alumina sol, alumina-silica sol and aluminum hydroxychloride sol at room temperature for about 15 min., removing said carrier from the mixture, flowing ammonia gas through said carrier for 20 min. for gelling said sol and sintering the resultant carrier in a stream of hydrogen at 350°C to 800°C for 3 hours.

* * * * *